US007518741B2

(12) United States Patent
Miyata

(10) Patent No.: US 7,518,741 B2
(45) Date of Patent: Apr. 14, 2009

(54) NOTIFICATION SYSTEM FOR NOTIFYING USER OF CONSUMABLE PRODUCT USED BY ELECTRONIC DEVICE

(75) Inventor: Yuji Miyata, Nishikasugai-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1102 days.

(21) Appl. No.: 10/420,837

(22) Filed: Apr. 23, 2003

(65) Prior Publication Data

US 2003/0202202 A1 Oct. 30, 2003

(30) Foreign Application Priority Data

Apr. 25, 2002 (JP) ............................ 2002-124446
Mar. 7, 2003 (JP) ............................ 2003-061454

(51) Int. Cl.
*G06F 15/00* (2006.01)
*G06K 1/00* (2006.01)

(52) U.S. Cl. ...................... 358/1.1; 358/1.15; 358/1.16; 358/1.17; 358/1.18; 710/19; 379/1.01; 340/500

(58) Field of Classification Search ....... 358/1.15–1.18, 358/1.13, 1.1; 399/27, 24; 347/217; 340/691.1, 340/500; 714/4; 710/10, 19; 379/1.01
See application file for complete search history.

(56) References Cited

U.S. PATENT DOCUMENTS

| | | | | |
|---|---|---|---|---|
| 5,821,975 | A * | 10/1998 | Gunther et al. | 347/217 |
| 6,295,423 | B1 * | 9/2001 | Haines et al. | 399/24 |
| 6,529,692 | B1 * | 3/2003 | Haines et al. | 399/27 |
| 6,745,253 | B2 * | 6/2004 | Struble | 710/10 |
| 6,892,317 | B1 * | 5/2005 | Sampath et al. | 714/4 |
| 6,898,907 | B2 * | 5/2005 | Diamond | 52/202 |
| 6,909,519 | B2 * | 6/2005 | Parry | 358/1.13 |
| 6,989,907 | B1 * | 1/2006 | Jeyachandran et al. | 358/1.15 |
| 6,999,190 | B2 * | 2/2006 | Shimbori et al. | 358/1.15 |
| 7,061,391 | B2 * | 6/2006 | Hopper et al. | 340/691.1 |
| 7,242,491 | B2 * | 7/2007 | Nakayasu et al. | 358/1.15 |
| 2003/0086114 | A1 * | 5/2003 | Cherry et al. | 358/1.15 |

FOREIGN PATENT DOCUMENTS

| | | |
|---|---|---|
| JP | A 8-230286 | 9/1996 |
| JP | A 10-244735 | 9/1998 |
| JP | A 10-301726 | 11/1998 |

* cited by examiner

*Primary Examiner*—Edward L Coles
*Assistant Examiner*—Satwant K Singh
(74) *Attorney, Agent, or Firm*—Oliff & Berridge, PLC

(57) ABSTRACT

When paper needs to be loaded into a printing device but there is no particular hurry, a destination to issue a paper load notification is set to a user having the greatest amount of paper usage. When paper must be loaded into a printing device as quickly as possible, the notification destination is set to a user that has issued a print command within a prescribed time period prior to the current time.

30 Claims, 10 Drawing Sheets

FIG.8

USER DATA

| USERNAME | ADDRESS | 1st PAPER LOADING FLAG | 2nd PAPER LOADING FLAG |
|---|---|---|---|
| USER U1 | unser1@eigyou.xxx.co.jp | TRUE | TRUE |
| USER U2 | unser2@eigyou.xxx.co.jp | TRUE | TRUE |
| USER U3 | unser3@kaihatsu.xxx.co.jp | TRUE | TRUE |
| USER U4 | unser4@kaihatsu.xxx.co.jp | TRUE | TRUE |
| USER U5 | unser5@kaihatsu.xxx.co.jp | TRUE | TRUE |
| USER U6 | unser6@katyou.xxxco.jp | FALSE | TRUE |
| USER U7 | unser7@butyou.xxx.co.jp | FALSE | FALSE |

FIG.9

PRINT INFORMATION

| DATE AND TIME | USERNAME | TERMINAL NAME | PAGES |
|---|---|---|---|
| 1/8 14:00 | USER U2 | TERMINAL B | 4 0 |
| 1/8 14:00 | USER U1 | TERMINAL A | 1 0 |
| 1/8 14:01 | USER U4 | TERMINAL D | 1 0 |

FIG. 10

PAGE-NUMBER DATA

| USERNAME | TOTAL NUMBER OF PRINT PAGES |
|---|---|
| USER U1 | 70 |
| USER U2 | 60 |
| USER U3 | 130 |
| USER U4 | 20 |
| USER U5 | 90 |
| USER U6 | 70 |
| USER U7 | 80 |

FIG. 11

| FIRST NOTIFICATION FLAG | SECOND NOTIFICATION FLAG |
|---|---|
| TRUE | FALSE |

NOTIFICATION SYSTEM FOR NOTIFYING USER OF CONSUMABLE PRODUCT USED BY ELECTRONIC DEVICE

BACKGROUND OF THE INVENTION

1. Field of the Invention

The present invention relates to a notification system for notifying a user of a consumable product used by an electronic device.

2. Description of the Related Art

A printing device is one of electronic device that uses such consumable products as paper, toner, and the like. When the printing device runs out of paper or toner, then a user that needs printing loads paper or replaces a toner cartridge. Loading paper and replacing a toner cartridge can be a hindrance to the user, particularly when the user needs to print material urgently, since printing cannot be performed during this time.

Various technologies have been proposed and developed to eliminate this problem. One such technology is disclosed in Japanese unexamined patent application publication No. HEI-8-230286. This technology predicts the time in which the printing device will run out of paper, notifies the administrator of the printing device or a fulltime operator who loads paper about the predicted time. Alternatively, the technology notifies the terminal that last outputted printing data.

However, this technology only notifies a specific user, such as the administrator or fulltime operator of the printing device, of the predicted time in which the printing device will run out of paper, placing a great burden on this particular person. Further, when notifying the last terminal device to output print data of the predicted time, there is a possibility that a user that does not use the printing device very often may be notified more frequently than a user that uses the printing device frequently, resulting in an unfair distribution among the users. Other technologies, such as that disclosed in Japanese patent application publication No. HEI-10-301726, have the same problem.

On some occasions when there is very little paper or the like remaining, it may be desirable to direct users to take measures as quickly as possible.

SUMMARY OF THE INVENTION

In view of the foregoing, it is an object of the present invention to overcome the above problems and also to provide a notification system capable of distributing notifications fairly among users, without placing a large burden upon a particular person. It is another object of the present invention to provide a notification system capable of notifying a user that can quickly take necessary measures, such as loading paper.

In order to attain the above and other objects, the present invention provides a notification system including an electronic device that uses a consumable product and a plurality of terminal devices each communicable with the electronic device. The electronic device includes a detecting unit that detects a remaining potential usage of the consumable product, a plurality of destination determining units, each destination determining unit determining at least one destination device from the terminal devices, a unit selecting unit that selects one of the plurality of destination determining units based on the remaining potential usage detected by the detecting unit, wherein one of the destination determining units selected by the unit selecting unit determines at least one destination device from the terminal devices, and a notifying unit that notifies at least one user of information relating to the consumable product through the at least one destination device determined by the selected destination determining unit.

There is also provided a notification system including an electronic device that uses a consumable product and a plurality of terminal devices each communicable with the electronic device. The electronic device includes a memory that stores one of first usage history of the electronic device for each of a plurality of users and second usage history of the electronic device for each of the plurality of terminal devices, a determining unit that determines at least one destination device from the plurality of terminal devices based on the one of the first usage history and the second usage history, and a notify unit that notifies the destination device of information regarding to the consumable product.

There is also provided a notification system including an electronic device that uses a consumable product and a plurality of terminal devices each communicable with the electronic device. The electronic device includes, a location detecting unit that detects one of user locations of a plurality of users and device locations of the plurality of terminal devices, a determining unit that determines at least one destination device from the plurality of terminal devices based on detection results of the location detecting unit, and a notify unit that notifies the at least one destination device of information regarding to the consumable product.

There is also provided a notification system including an electronic device that uses a consumable product and a plurality of terminal devices each communicable with the electronic device. The electronic device includes a status detecting unit that detects operating status of each of the plurality of terminal devices, a determining unit that determines at least one destination device from the plurality of terminal devices based on detection results of the status detecting unit, and a notify unit that notifies the at least one destination device of information regarding to the consumable product.

There is also provided a notification system including an electronic device that uses a consumable product and a plurality of terminal devices each communicable with the electronic device. The electronic device includes an operating unit that performs processes using consumable product when requested by one of users and the plurality of terminal devices, a memory that stores one of a first data indicating processes requested by the users in association with the users and a second data indicating processes requested by the terminal devices in association with the terminal devices, a detecting unit that detects at least one of the users and the terminal devices having requested a process that has not been completed, based on one of the first data and the second data stored in the memory, a determining unit that determines at least one notification destination from the at least one of the users and the terminal devices detected by the detecting unit, and a notify unit that notifies the at least one notification destination of the information regarding to the consumable product.

There is also provided an electronic device including an operating unit that performs processes using a consumable product, a detecting unit that detects a remaining potential usage of the consumable product, a plurality of determining units, each determining a destination device from a plurality of terminal devices, a unit selecting unit that selects one of the plurality of destination determining units based on detection results of the detecting unit, wherein the selected one of the destination determining units determines the destination device, and a notify unit that notifies a user of information relating to the consumable product through the destination device.

There is also provided an electronic device including a communication unit that is communicable with a plurality of terminal devices, a memory that stores one of a first amount of the consumable product used by each of a plurality of users and a second amount of the consumable product used by each of the plurality of terminal devices, a determining unit that determines at least one destination device from the plurality of terminal devices based on one of the first amount and the second amount stored in the memory, and a notify unit that notifies the at least one destination device of information relating to the consumable product.

There is also provided an electronic device including a communication unit that is communicable with a plurality of terminal devices, an operating unit that performs processes using a consumable product, a detecting unit that detects one of user locations of a plurality of users and device locations of the terminal devices, a determining unit that determines at least one destination device from the plurality of terminal devices based on detection results of the detecting unit, and a notify unit that notifies the destination device of information regarding to the consumable product.

There is also provided an electronic device including an operating unit that performs processes using a consumable product, a communication unit that is communicable with a plurality of terminal devices, a second detecting unit that detects operating status of each of the plurality of terminal devices, and a determining unit that determines at least one destination device from the plurality of terminal devices based on the detection results of the second detecting units, and a notify unit that notifies the at least one destination device of information regarding to the consumable product.

There is also provided an electronic device including a communication unit that communicable with a plurality of terminal devices, an operating unit that performs processes using a consumable product when requested by one of users and the terminal devices, a memory that stores one of a first data regarding processes requested by the users in association with the users and a second data regarding processes requested by the terminal devices in association with the terminal devices, a determining unit that determines, as a notification destination, at least one of the users and the terminal devices having requested a process that has not been completed, based on one of the first data and the second data stored in the memory, and a notify unit that notifies the notification destination of information regarding to the consumable product.

There is also provided a notifying method of notifying a destination device of information relating to a consumable product. The notify method includes the steps of detecting a remaining potential usage of a consumable product that is used by an electronic device communicable with each of a plurality of terminal devices, selecting one of a plurality of determining methods based on the detected remaining potential usage, determining a destination device from the plurality of terminal devices in accordance with the selected method, and notifying a user of information relating to the consumable product through the destination device.

There is also provided a notifying method of notifying a destination device of information relating to a consumable product. The notify method includes the steps of storing, into a memory, one of a first amount of a consumable product used by each of a plurality of users and a second amount of the consumable product used by each of a plurality of terminal devices, the consumable product being provided to an electronic device communicable with each of the plurality of terminal devices, determining a destination device from the plurality of terminal devices based on one of the first amount and the second amount stored in the memory, and notifying the destination device of information relating to the consumable product.

There is also provided a notifying method of notifying a destination device of information relating to a consumable product. The notify method includes the steps of detecting one of user locations of a plurality of users and device locations of a plurality of terminal devices communicable with an electronic device, determining a destination device from the plurality of terminal devices based on the detected locations, and notifying the destination device of information relating to a consumable product that is used in the electronic device.

There is also provided a notifying method of notifying a destination device of information relating to a consumable product. The notify method includes the steps of detecting operating status of each of a plurality of terminal devices each communicable with an electronic device, determining a destination device from the plurality of terminal devices based on the detected operating status, and notifying the destination device of information regarding to a consumable product that is used by the electronic device.

There is also provided a notifying method of notifying a destination device of information relating to a consumable product. The notify method includes the steps of storing one of a first data and a second data into a memory, the first data regarding to processes requested by users in association with the users, the second data regarding to processes requested by terminal devices each communicable with an electronic device in association with the terminal devices, the process being performed by the electronic device using a consumable product, determining, as a notification destination, at least one of the users and the terminal devices having requested a process which has not been completed, based on one of the first data and the second data stored in the memory, and notifying the notification destination of information regarding to the consumable product.

There is also provided a notifying program of notifying a destination device of information relating to a consumable product. The notify program includes the programs of detecting a remaining potential usage of a consumable product that is used by an electronic device communicable with each of a plurality of terminal devices, selecting one of a plurality of determining methods based on the detected remaining potential usage, determining a destination device from the plurality of terminal devices in accordance with the selected method, and notifying a user of information relating to the consumable product through the destination device.

There is also provided a notifying program of notifying a destination device of information relating to a consumable product. The notify program includes the programs of storing, into a memory, one of a first amount of a consumable product used by each of a plurality of users and a second amount of the consumable product used by each of a plurality of terminal devices, the consumable product being provided to an electronic device communicable with each of the plurality of terminal devices, determining a destination device from the plurality of terminal devices based on one of the first amount and the second amount stored in the memory, and notifying the destination device of information relating to the consumable product.

There is also provided a notifying program of notifying a destination device of information relating to a consumable product. The notify program includes the programs of detecting one of user locations of a plurality of users and device locations of a plurality of terminal devices communicable with an electronic device, determining a destination device from the plurality of terminal devices based on the detected locations, and notifying the destination device of information relating to a consumable product that is used in the electronic device.

There is also provided a notifying program of notifying a destination device of information relating to a consumable product. The notify program comprising the programs of detecting operating status of each of a plurality of terminal devices each communicable with an electronic device, determining a destination device from the plurality of terminal devices based on the detected operating status, and notifying the destination device of information regarding to a consumable product that is used by the electronic device, There is also provided a notifying program of notifying a destination device of information relating to a consumable product. The notify program includes the programs of storing one of a first data and a second data into a memory, the first data regarding to processes requested by users in association with the users, the second data regarding to processes requested by terminal devices each communicable with an electronic device in association with the terminal devices, the process being performed by the electronic device using a consumable product, determining, as a notification destination, at least one of the users and the terminal devices having requested a process which has not been completed, based on one of the first data and the second data stored in the memory, and a notifying the notification destination of information regarding to the consumable product.

BRIEF DESCRIPTION OF THE DRAWINGS

In the drawings:

FIG. 8 is an explanatory diagram showing an example of user data;

FIG. 9 is an explanatory diagram showing an example of print information;

FIG. 10 is an explanatory diagram showing an example of page-number data;

FIG. 11 is an explanatory diagram showing first and second notification flags.

DESCRIPTION OF THE PREFERRED EMBODIMENT

A notification system according to an embodiment of the present invention will be described while referring to the accompanying drawings.

Figure 1:
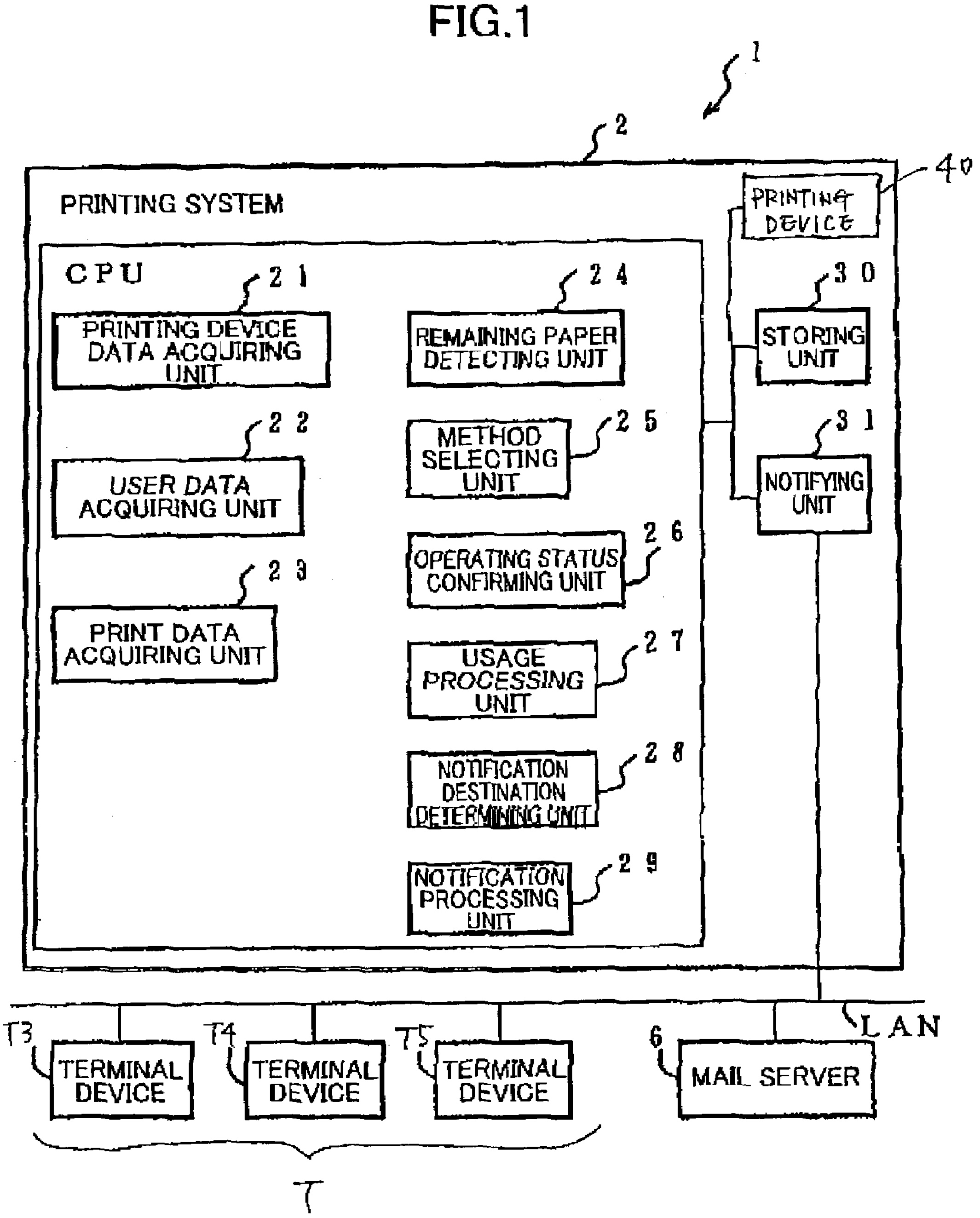
FIG. 1 is a block diagram showing the construction of a notification system according to an embodiment of the present invention.

First, construction of a notification system according to the present embodiment will be described with reference to FIG. 1. As shown in FIG. 1, a notification system 1 according to the present embodiment includes a printing system 2, terminal devices T3, T4, T5, and a mail server 6, communicable with each other through a local area network (LAN) The printing system 2 has a printing device 40, such as an inkjet printer or a laser printer, and a print managing server including a central processing unit (CPU) 20, a storing unit 30, and a notifying unit 31. The terminal devices T3, T4, and T5 (hereinafter collectively referred to as "terminal devices T") are personal computers, for example. Users can issue print commands to the printing system 2 using the terminal devices T. While three terminal devices T are shown in FIG. 1, the present invention is not limited to the number of terminal devices T.

The CPU 20 functions as a printing device data acquiring unit 21, an user data acquiring unit 22, a print data acquiring unit 23, a remaining paper detecting unit 24, a method selecting unit 25, an operating status confirming unit 26, a usage processing unit 27, a notification destination determining unit 28, and a notification processing unit 29, by executing programs stored in the storing unit 30.

The remaining paper detecting unit 24 detects the remaining number of sheets of paper loaded in the printing device 40 and sets a remaining sheet number (variable) r to the detected number of remaining sheets of paper. The number of remaining sheets can be detected based on the thickness of all paper loaded in the printing device 40 and the type of paper (high quality paper, transparencies, and the like).

The printing device data acquiring unit 21 acquires a first paper refill number Th1, a second paper refill number Th2, a paper type, a sheet-housing capacity of the printing device 40, and the like based on information input by an administrator using the printing system 2 or the terminal device T, and stores the acquired data as printer data into the storing unit 30. The first paper refill number Th1 is set larger than the second paper refill number Th2. If the number of sheets of paper provided in the printing device 40 has been reduced to the first paper refill number Th1, then this means it is desirable to refill the printing device 40 with paper. If the number of sheets of paper provided in the printing device 40 has decreased to the second paper refill number Th2, then this means it is necessary to refill the printing device 40 with paper quickly.

The user data acquiring unit 22 is for generating and storing user data into the storing unit 30 based on information input by the administrator. The administrator can input such information through input tools by starting up the user data acquiring unit 22, for example. Specifically, when the administrator inputs usernames, users' e-mail addresses, first obligation data, and second obligation data, then the user data acquiring unit 22 generates user data for each user by associating the username with the user's e-mail address, a first paper loading flag, and a second paper loading flag, and stores the user data into the storing unit 30. An example of the user data is shown in FIG. 8. The first obligation data indicates whether each user is obligated to load paper in the printing device 40 when the remaining sheet number r is greater than or equal to the second paper refill number Th2 and less than the first paper refill number Th1 (Th2 r<Th1) (hereinafter referred to as "medium urgency") The second obligation data indicates whether each user is obligated to load paper in the printing device 40 when the remaining sheet number r is less than the second paper refill number Th2 (r<Th2) (hereinafter referred to as "high urgency"). The first and second paper lading flags correspond to the first and second obligation data, respectively. The first and second paper loading flags are set to "true" if the user is obligated to load paper when the need arises, and are set to "false" when the user is not obligated to load paper when the need arises.

When the user data acquiring unit 22 generates and stores the user data as described above, the usage processing unit 27 generates and stores page-number data into the storing unit 30. An example of the page-number data is shown in FIG. 10. The page-number data is for indicating total number of print page of each user. The total number of print page is initialized to 0 when the page-number data is first generated.

When a user has issued a print command from one of the terminal devices T, the usage processing unit 27 obtains the username of the user and the number of pages to be printed. Then, the usage processing unit 27 updates page-number data (usage history) stored in the storing unit 30 by adding the number of pages to be printed to a total number of print pages associated with the username of the user. The usage processing unit 27 also resets the total number of print pages to "0" for a user that has loaded paper into the printing device 40.

When a user issues a print command from one of the terminal devices T, the print data acquiring unit 23 acquires the username of the user, a device name of the terminal device T (terminal name), and the number of sheets of paper to be printed based on the print command. Based on the acquired data, the print data acquiring unit 23 stores print information as usage history into the storing unit 30 by associating the username, the terminal name, and the number of sheets to be printed with the current time. An example of the print information is shown in FIG. 9.

The method selecting unit 25 selects a first determining method among a plurality of predetermined determining methods when there is medium urgency (Th2 r<Th1), and selects a second determining method among the predetermined determining methods when there is high urgency (r<Th2).

That is, when the printing device 40 needs to be filled with paper and the remaining sheet number r is low enough that the paper must be loaded quickly (r<Th2), then the method selecting unit 25 selects the second determining method. However, if the remaining sheet number r is not so low that the paper must be loaded immediately but it is desirable that the printing device 40 be loaded with paper (Th1>r Th2), then the method selecting unit 25 selects the first determining method.

In addition, when the printing system receives a print command and the number of pages to be printed (required-page total-number) xtotal is larger than the remaining sheet number r (xtotal>r), then the method selecting unit 25 selects a third determining method from the predetermined determining methods.

The operating status confirming unit 26 confirms the operating status of a terminal device T based on whether the terminal device T has issued a print command to the printing system 2 within a prescribed amount of time in the past.

The notification destination determining unit 28 determines a notification destination according to the determining method selected by the method selecting unit 25.

The notification processing unit 29 sets and changes the state of a first notification flag and the state of a second notification flag between the values "true" and "false" (FIG. 11). The first notification flag is for indicating whether a notification to load paper has been sent to a user during a time of medium urgency, and the second notification flag is for indicating whether a notification to load paper has been sent to a user during a time of high urgency. More specifically, the notification processing unit 29 initializes both the first and second notification flags to "false" at the time of when the user data (FIG. 8) is stored into the storing unit 30. Then, the notification processing unit 29 sets the first notification flag to "true" after the notification destination has been determined during a time of medium urgency, and resets the first notification flag to "false" after the user has loaded paper into the printing device 40.

Similarly, the notification processing unit 29 sets the second notification flag to "true" after the notification destination has been determined during a time of high urgency, and resets the second notification flag to "false" after the user has loaded paper into the printing device 40.

Further, the notification processing unit 29 performs a process to determine whether to issue a notification based on the states of the first and second notification flags and elapsed time after sending a notification to load paper.

The storing unit 30 stores various computer programs, such as programs for instructing the CPU 20 to perform a notification process to be described later. The storing unit 30 also stores the user data (FIG. 8), the print information (FIG. 9), the page-number data (FIG. 10), and the first and second notification flags (FIG. 11). The notifying unit 31 transmits a notification to load paper (paper load notification) to the notification destination.

Figure 2:
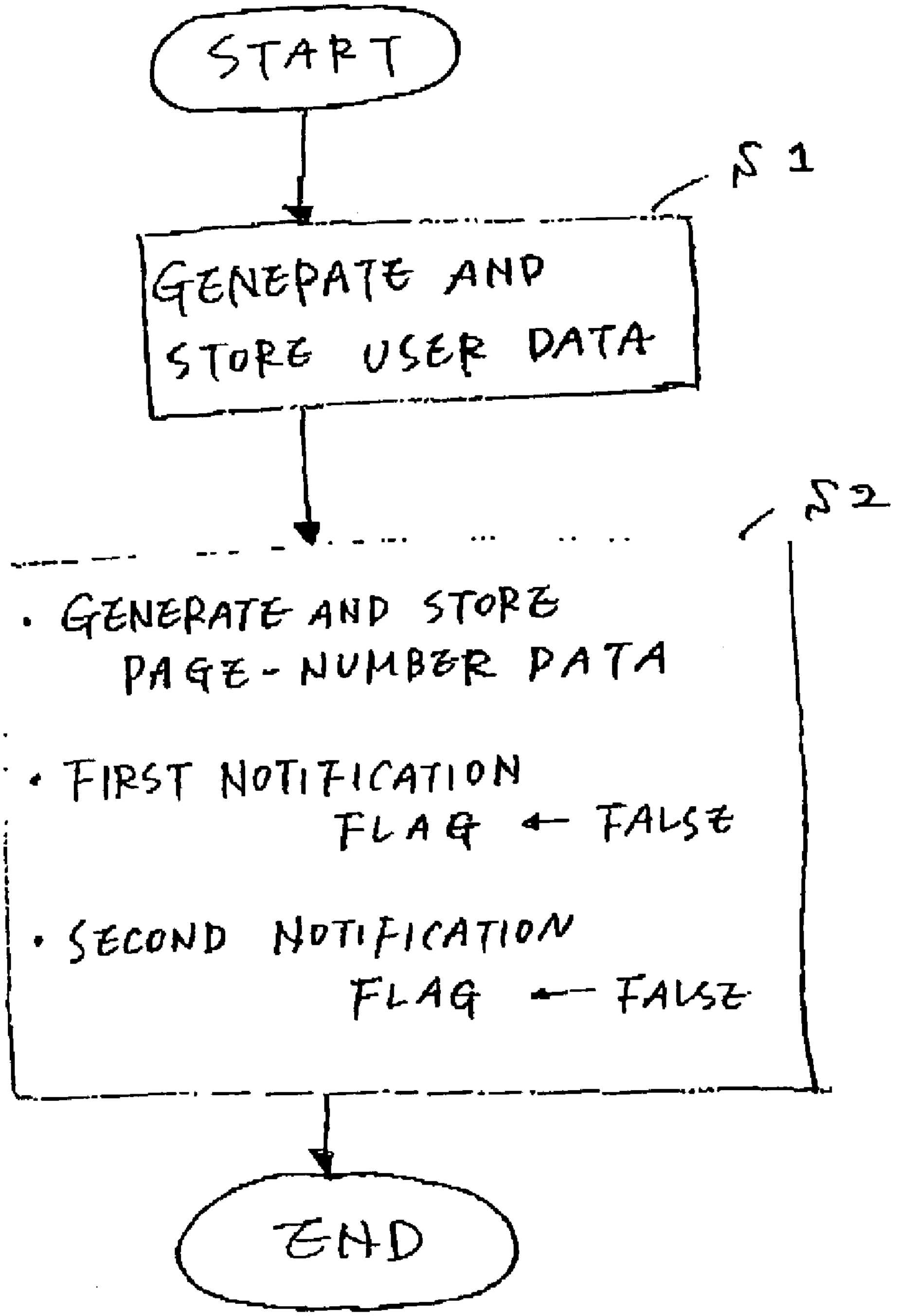
FIG. 2 is a flowchart representing a user-data input process according to the embodiment of the present invention

Next, a user-data input process according to the present embodiment will be described with reference to the flowchart of FIG. 2. The user-data input process is executed by the CPU 20 functioning as the user data acquiring unit 22 and the like when the administrator starts up the user data acquiring unit 22, for example.

When the process starts, first in S1 an input prompt is displayed on a display (not shown) of the printing device 40 prompting the administrator to input usernames, e-mail addresses of users, first obligation data, and second obligation data, and then the user data acquiring unit 22 generates and stores user data into the storing unit 30 (FIG. 8). Next in S2, the usage processing unit 27 generates and stores page-number data (FIG. 10) into the storing unit 30. At this time, the total number of print page for each user is initialized to 0. Also, in S2, the notification processing unit 29 resets the first and second notification flags (FIG. 11) to "false". Then, this process ends.

The administrator can add users to or delete users from the user data and can change the settings of the first and second obligation flags for each user any time through the user-data input process.

Figure 3:
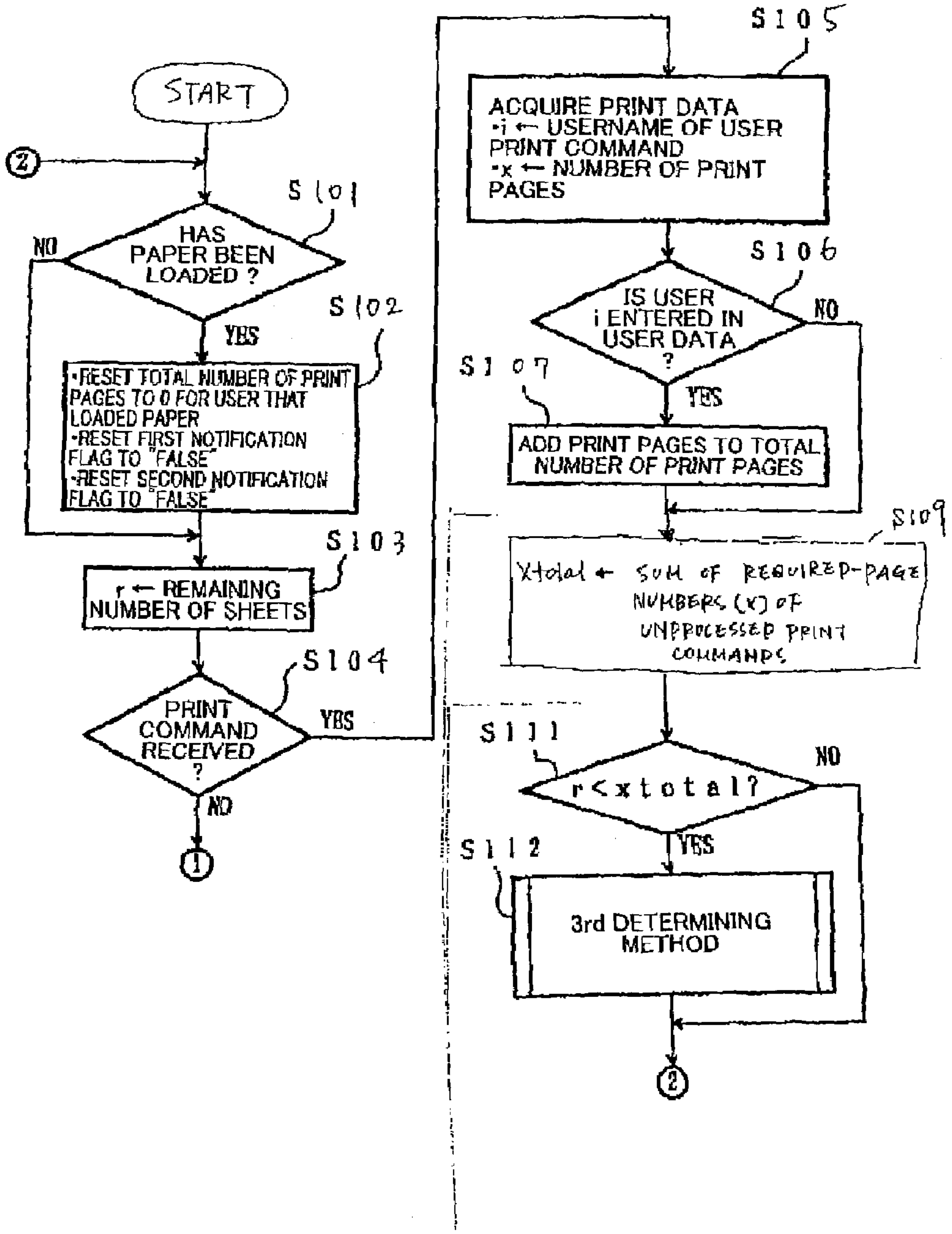
FIG. 3 is a flowchart representing a first part of a notification process according to the embodiment of the present invention.

Next, the paper load notification process performed by the notification system 1 will be described with reference to the flowcharts of FIGS. 3 and 4. The notification process is for selecting a determining method, determining a destination in accordance with the selected determining method, and issuing a paper load notification to the determined destination. This notification process starts when a main switch of the printing device 40 is turned ON.

In S101, the determining unit 28 determines whether or not paper has been loaded. If so (S101: YES), then the process advances to S102. On the other hand, if not (S101: NO), then the process skips to S103.

In S102, the usage processing unit 27 sets the number of print pages of the page-number data (FIG. 10) of a user that has loaded the paper to "0". At the same time, the notification processing unit 29 resets the first and second notification flags to "false". By setting the number of print pages to "0", it is possible to prevent transmission of a paper load notification to a user that has only used a small amount of paper since having loaded the printing device 40 in response to a previous notification. In other words, the past processing records of users are considered when determining the notification destination, preventing too many notifications from being sent to one particular user. Here, a user that has loaded paper could be identified by requesting the user to identify himself or herself through operations on a control panel (not shown) provided on the printing device 40. Alternatively the last person to be notified could be assumed to have loaded paper.

In S103, the remaining paper detecting unit 24 detects the remaining number of sheets of paper loaded in the printing device 40 provided in the printing system 2 and sets the remaining sheet number (variable) r to this number.

In S104, the print data acquiring unit 23 determines whether a print command has been transmitted from the terminal device T. It so (S104: YES), then the process advances to S105. On the other hand, if not (S104: NO), then the process advances to S113 in FIG. 4.

Process in S105-S112 is for determining a notification destination based on the third determining method and sending a paper load notification to the notification destination if a required-page total-number xtotal is greater than the remaining sheet number r (xtotal>r).

In S105, the print data acquiring unit 23 obtains the username of the user issuing the print command, the name of the terminal device T that the user used to issue the print command, and a number of required pages for the print command. Then, the print data acquiring unit 23 stores print information as shown in FIG. 9 by associating the username, the name of the terminal device T, and the number of required pages into the storing unit 30. Also, the print data acquiring unit 23 sets a user (variable) i to the username of the user issuing the print command and sets a required-page number (variable) x to the number of pages required by the print command.

In S106, the usage processing unit 27 determines whether the user i is been entered in the user data (FIG. 8). If not (S106: NO), then the process proceeds to S111. On the other hand, if so (S106: YES), then the process advances to S107.

In S107, the usage processing unit 27 updates the page-number data (FIG. 10) of the user i by adding the required page number x to the current total number of print pages. In S109, the method selecting unit 25 sets a required-page total-number (variable) xtotal to a sum of the required-page numbers x of print commands for which printing has not been completed (hereinafter referred to as "unprocessed print command"). Then, the process advances to S111.

In S111, the method selecting unit 25 determines whether or not the required-page total-number xtotal is larger than the remaining sheet number r (xtotal>r). If not (S111: NO), then this means that the entire printing process for all the unprocessed print commands can be completed using the paper currently loaded in the printing device 40. Therefore, the process returns to S101. On the other hand, if so (S111: YES), then this means that the entire printing process for all the unprocessed print commands cannot be completed using the paper currently loaded in the printing device 40, so the process advances to S112, thereby selecting the third determining method.

In S112, the determining unit 28 performs a process according to the third determining method to select a notification destination and transmits a paper load notification to the selected notification destination. Then, the process returns to S101. Details of the process executed in S112 will be described later.

In S113, the method selecting unit 25 determines whether or not the remaining sheet number r is less than the second paper refill number Th2. If so (S113: YES), then this means that there is high urgency, and the process advances to S114. In this manner, the second determining method is selected. On the other hand, if not (S113: NO), then the process advances to S121.

In the process of S114 through S120, a notification destination is selected based on the second determining method, and a paper load notification is sent to the notification destination.

Specifically, in S114, the determining unit 28 selects a notification destination according to the second determining method. A notification destination user (variable) j is set to the username of the user of the determined notification destination. When a notification destination cannot be determined, then the notification destination user j is set to "no user". A more detailed description will be provided later with reference to the flowchart of FIG. 6.

In S115, the notification processing unit 29 determines whether the notification destination user j is "no user." If so (S115: YES), then this means that there is no target to notify, so a paper load notification is not issued. Then, the process returns to S101. On the other hand, if the notification destination user j is not "no user" (S115: NO), then the process advances to S116.

In S116, the notification processing unit 29 determines whether or not the second notification flag is set to "false" If so (S116: YES), then the process proceeds to S118. On the other hand, if not (S116: NO), then the process proceeds to S117, where it is determined whether or not a predetermined second notification time interval has elapsed since a second notification-ending time t2. If so (S117: YES), then the process advances to S118. On the other hand, if not (S117: NO), then the process returns to S101.

In S118, the notification processing unit 29 sets the second notification ending time t2 to the current time and sets the second notification flag to "true".

In S119, the notification processing unit 29 sets a destination e-mail address (variable) a to the e-mail address of the notification destination user j based on the user data (FIG. 8).

In S120, the notifying unit 31 transmits a paper load notification by e-mail to the destination e-mail address a, requesting the user to load paper. Subsequently, the process returns to S101.

That is, since the second notification flag is "false" when the process of S116 is first performed, a paper load notification is always issued. Since the second notification flag is set to "true" thereafter, a paper load notification is performed only if the second notification interval has elapsed since the previous notification was issued at the second notification-ending time t2. A paper load notification is not issued before the second notification time interval has elapsed after a paper load was previously requested in order to reduce the burden and waste of successively issuing notifications within a short time period.

In S121, the method selecting unit 25 determines whether or not the remaining sheet number r is less than the first paper refill number Th1. If so (S121: YES), this means that there is minimum urgency, so that the process advances to S122. In this manner, the first determining method is selected. On the other hand, if not (S121: NO), then the printing device 40 in the printing system 2 has enough paper that it is not necessary to load more. Accordingly, the process to request a paper load is not executed and the process returns to S101.

In the process in S122 through S128, a notification destination is selected based on the first determining method, and a paper load notification is issued to the selected notification destination.

Specifically, first in S121, the determining unit 28 determines a notification destination according to the first determining method. The notification destination user j is set to the username of the user at the determined notification destination. However, if the notification destination cannot be determined, then the notification destination user j is set to "no user". This process is described in more detail later with reference to the flowchart of FIG. 7.

In S123, the notification processing unit 29 determines whether or not the notification destination user j is "no user". If the notification destination user j is determined "no user" (S123: YES), then there is no target for issuing a paper load notification, and the process returns to S101. On the other hand, if the notification destination user j is not "no user" (S123: NO) then the process advances to S124.

In S124, the notification processing unit 29 determines whether or not the first notification flag is set to "false". If so (S124: YES), then the process proceeds to S126. On the other hand, if not (S124: NO), then the process proceeds to S125, where the notification processing unit 29 determines whether or not a predetermined first notification time interval has elapsed since a first notification-ending time t1. If so (S125: YES), then the process advances to S126. On the other hand, if not (S125: NO), then the process returns to S101.

In S126, the notification processing unit 29 sets the first notification-ending time t1 to the current time and sets the first notification flag to "true".

In S127, the notification processing unit 29 sets the destination e-mail address a to the e-mail address of the notification destination user j based on the user data (FIG. 8).

In S128, the notifying unit 31 transmits a paper load notification by e-mail to the destination e-mail address a, requesting the user to load paper. Subsequently, the process returns to S101.

That is, the first notification flag is "false" when the process of S124 is first performed, a paper load notification is always issued. Since the first notification flag is set to "true" thereafter, a paper load notification is issued after the first notification time interval has elapsed since the previous notification was issued. A notification is not repeated before the first notification time interval has elapsed after a paper load was requested in order to reduce the burden and waste of successively issuing notifications within a short time period.

Figure 5:
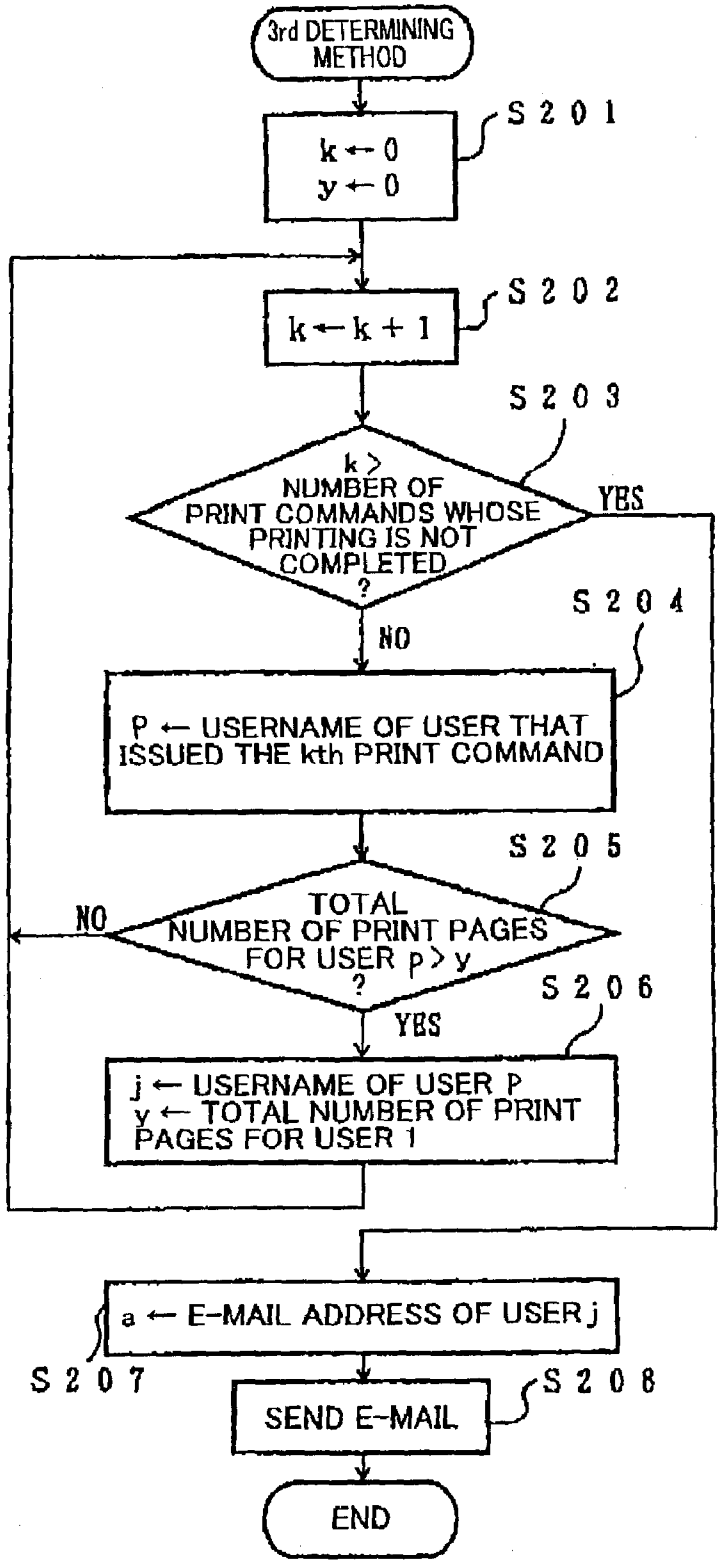
FIG. 5 is a flowchart representing a destination determining process executed in S112 of FIG. 3.

Next, the process executed in S112 will be described in more detail with reference to the flowchart of FIG. 5.

First in S201, the determining unit 28 sets a counter value k to 0 and a sheet number y to 0 The sheet number y is a variable used for finding a user having the highest total number of print pages.

In S202, the determining unit 28 increments the counter value k by 1 (k←k+1)

In S203, the determining unit 28 determines whether or not counter value k is larger than the number of unprocessed print commands for which printing has not been completed. If not (S203: NO), then the process advances to S204. On the other hand, if so (S203: YES), this means that the present process has been performed for all the unprocessed print commands, so that the process proceeds to S207.

In S204, the determining unit 28 sets a user (variable) p to the username of a user that has transmitted a $k^{th}$ one of the unprocessed print commands based on the print information (FIG. 9).

In S205, the determining unit 28 determines whether or not the total number of print pages of the user p is larger than the sheet number y based on the page-number data (FIG. 10) stored in the storing unit 30. If the total number of print pages is determined to be larger than the sheet number y (S205: YES), then the process advances to S206. On the other hand, if the total number of print pages is determined to be less than or equal to the sheet number y (S205: NO), then the process returns to S202.

In S206, the determining unit 28 sets the notification destination user j to the username of the user p and overwrites the sheet number y with the total number of print pages of the user p. Subsequently, the process returns to S202.

In S207, the notification processing unit 29 sets the destination e-mail address a to the e-mail address of the notification destination user j by using the user data (FIG. 8). In S208, the notifying unit 31 transmits a paper load notification by e-mail to the destination e-mail address a, requesting the user to load paper.

To summarize this process using the example of FIGS. 9 and 10, the counter value k and the sheet number y are set to 0 (S201). The counter value k is incremented by 1 to "1" (S202) Since the counter value k "1" is not larger than the number of unprocessed print commands "3" (S203: NO) the user p is set to the user U2 (S204). According to the page-number data (FIG. 10), the total number of print pages for the user U2 is "60", which is larger than the value "0" of the sheet number y (S205: YES) Accordingly, the notification destination user j is set to the user p=user U2. The sheet number y is overwritten by the total number of print pages for the user U2, which is "60" (S206).

The counter value k is incremented by 1 to "2" (S202). The counter value k of "2" is not greater than the number "3" of unprocessed print commands (S203: NO), and the user p is set to the user U1 (S204). The total number of print pages for the user U1 of "70" is larger than the value "60" of the sheet number y (S205: YES), and so the notification destination user j is set to the user p=user U1. The sheet number y is overwritten by the total number of print pages "70" for the user U1 (S206).

The counter value k is incremented by 1 to "3" (S202). The counter value k of "3" is not greater than the number "3" of unprocessed print commands (S203: NO), and the user p is set to the user U4 (S204). Because the total number of print pages for the user U4 of "20" is not greater than the value "70" of the sheet number y (S205: NO), the notification destination user j and the sheet number y are left unchanged.

The counter value k is incremented by 1 to "4" (S202). The counter value k of "4" is greater than the number "3" of print commands (S203: YES). Therefore, an e-mail is transmitted to the user at the notification destination (S207, S208), and the process of FIG. 5 ends. Accordingly, the user U1 becomes the target of notification in the examples of FIGS. 9 and 10.

Figure 6:
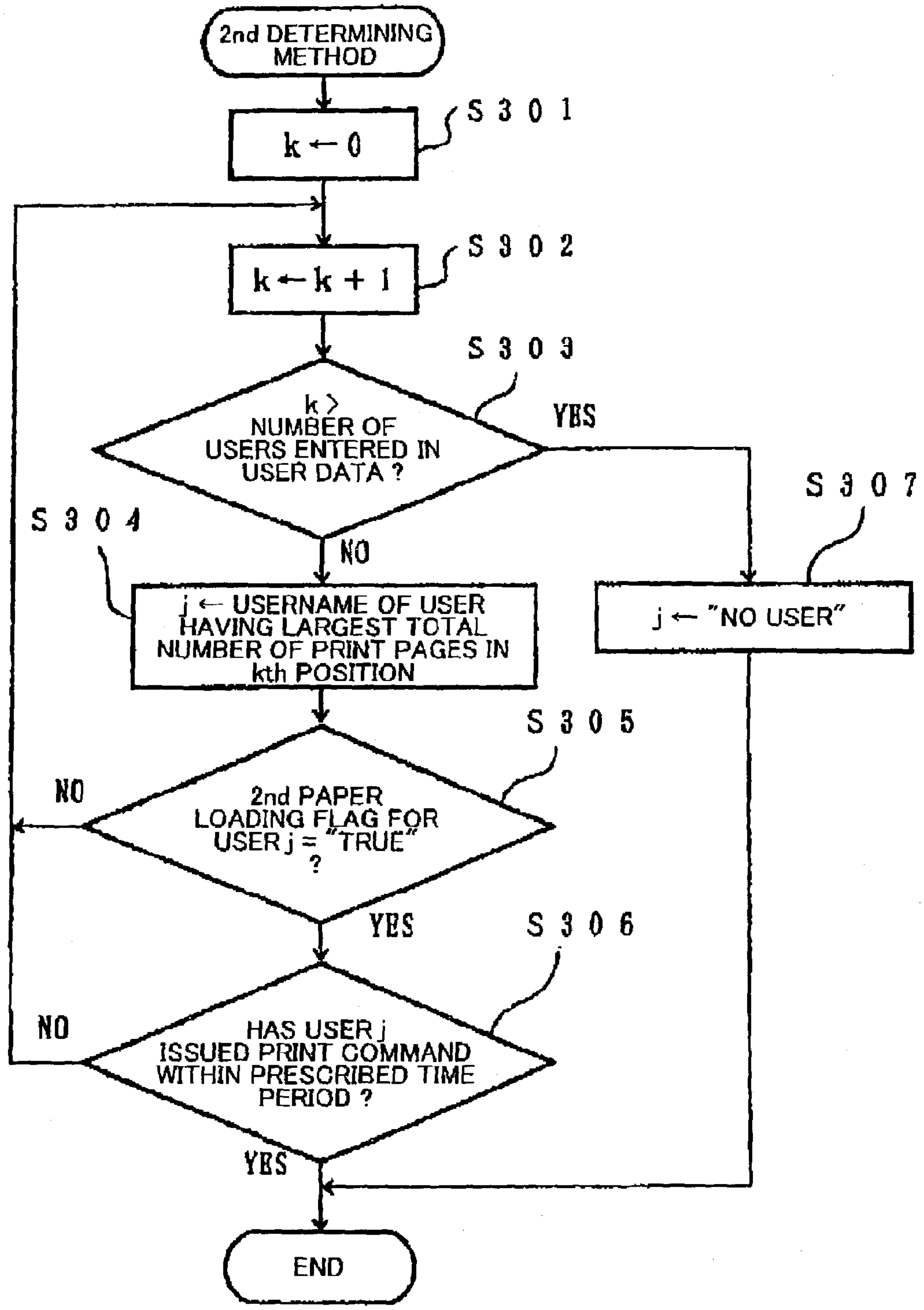
FIG. 6 is a flowchart representing a destination determining process executed in 114 of FIG. 4.

Next, the process executed in S114 of FIG. 4 will be described in more detail with reference to the flowchart of FIG. 6.

In S301, the determining unit 28 sets the counter value k to 0. In S302, the determining unit 28 increments the counter value k by 1 (k←k+1). In S303, the determining unit 28 determines whether or not the counter value k is greater than the number of users entered in the user data (FIG. 8). If the counter value k is not larger than the number of entered users (S303: NO), then the process advances to S304.

In S304, the determining unit 28 identifies the user having the $k^{th}$ largest total number of print pages based on page-number data (FIG. 10) and sets the notification destination user j to the username of the identified user.

In S305, the determining unit 28 determines whether or not the second paper loading flag for the notification destination user j is "true" based on the user data (FIG. 8). If so (S305: YES), then this means that the notification destination user j is obligated to load paper when there is high urgency, and the process advances to S306. On the other hand, if not (S305: NO), then this means that the notification destination user j is not obligated to load paper when there is high urgency, and the process returns to S302.

In S306, the operating status confirming unit 26 confirms the operating status of the terminal device T of the notification destination user j. One method of confirmation is to determine whether the user has executed an operation within the prescribed time period using the terminal device T. Another method is to actually attempt to communicate with the terminal device T to determine whether the terminal device T can communicate. Then, the determining unit 28 determines whether the notification destination user j has issued a print command within a prescribed time period (the past ten minutes, for example) based on the results confirmed by the operating status confirming unit 26. If it is determined that the notification destination user j has issued a print command within the prescribed time period (S306: YES), then the process of FIG. 6 ends. On the other hand, if it is determined that the notification destination user j has not issued a print command within the prescribed time period (S306: NO), then the user may be away from the terminal device T, and so the process returns to S302.

If it is determined in S303 that the counter value k is larger than the number of entered users (S303: YES), this means that there is no user that has issued a print command within the prescribed time period and whose second paper loading flag is "true". The process advances to S307, where the determining unit 28 sets the notification destination user j to "no user", and the present process ends.

In this process, a notification destination user j is set to a user that has an obligation to load paper during a high urgency period and who has issued a print command within a prescribed time period. By setting a user that has issued a print command within a prescribed time period as the notification destination, it can be deemed likely that this user is working on the terminal device T. Hence, the likelihood is high that the user can be notified of the need to load paper. Therefore, this determining method is appropriate when paper needs to be loaded quickly.

Figure 7:
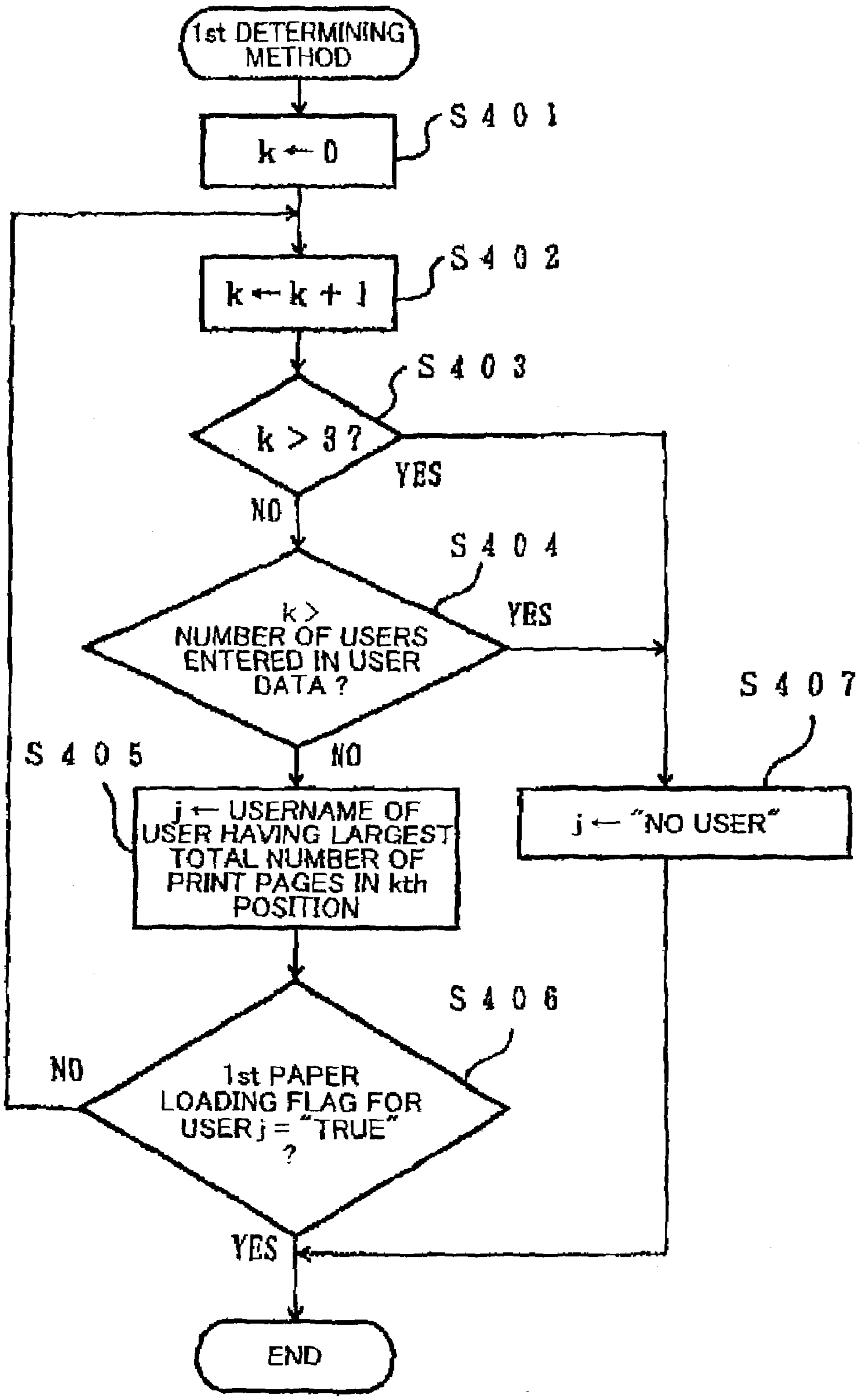
FIG. 7 is a flowchart representing a destination determining process executed in S122 of FIG. 4.

Next, the process executed in S122 of FIG. 4 will be described in more detail with reference to the flowchart of FIG. 7.

In S401, the determining unit 28 initializes the counter value k to 0. In S402, the determining unit 28 increments the counter value k by 1 (k←k+1).

In S403, the determining unit 28 determines whether the counter value k is greater than "3", which is a predetermined number. If not (S403: NO), then the process advances to S404. On the other hand, if so (S403: YES), then the process advances to S407. The number is predetermined to "3" so that this process is performed for only users having top three total number of print pages. Obviously the number 3 can be modified to 5 or the like.

In S404, the determining unit 28 determines whether or not the counter value k is greater than the number of users currently entered in the user data (FIG. 8). If not (S404: NO), then the process advances to S405. On the other hand, if so (S404: YES), then the process advances to S407.

In S405, the determining unit 28 identifies the user having the k$^{th}$ largest total number of print pages based on the page-number data (FIG. 10) and sets the notification destination user j to the username of the identified user.

In S406, the determining unit 28 determines whether or not the first paper loading flag for the notification destination user j is "true" based on the user data (FIG. 8). If not (S406: NO), then this means the notification destination user j is not obligated to load paper when there is medium urgency, and so the process returns to S402. On the other hand, if so (S406: YES), then this means that the user is obligated to load paper when there is medium urgency, and so the present process ends.

In S407, the determining unit 28 sets the notification destination user j to "no user" since the first paper loading flag is not set to "true" for any user having the three largest total number of print pages.

In this process, a user obligated to load paper when there is medium urgency and having one of the three largest total numbers of print pages is set as the notification destination. By setting the notification destination in this way, a user having a large total number of print pages is notified to load paper, thereby not placing the burden on a user that has a small total number of print pages. Accordingly, this determining method can establish fairness among users in regard to loading paper.

It should be noted that the determining processes in S104, S113, S120, and the like correspond to selecting step.

As described above, when there is high urgency (r<Th2), the notification system 1 according to the present embodiment can set a notification destination according to the second determining method, which has a high probability of notifying a user of the necessity to load paper. Therefore, the user can be expected to load the paper quickly.

Further, when there is medium urgency (Th2 r<Th1) where it is desirable to load paper but there is no particular hurry, the notification system 1 can determine a notification destination according to the first determining method for determining the destination based on paper usage of the users. Therefore, the problem of notifying only specific users to load paper is eliminated. As a result, it is possible to achieve fairness among users using the printing system 2 without placing a burden only on specific users.

Further, the notification destination is determined according to the second determining method when there is high urgency (r<Th2) where paper must be loaded quickly, and is determined according to the first determining method under medium urgency (Th2 r<Th1) where it is desirable to load paper but it is not urgent. Accordingly, it is possible to determine the notification destination based on the necessity of loading paper using a determining method appropriate to the magnitude of the necessity.

When the number of pages that must be printed on the printing device 40 exceeds the number of sheets of paper remaining in the printing device 40, then the user that has issued the print command is notified to load paper, thereby achieving fairness among users.

It is also possible to achieve fairness among users by determining a user to issue a paper load notification with consideration for past records of paper loading (records of measures taken in response to notifications).

While the invention has been described in detail with reference to specific embodiments thereof, it would be apparent to those skilled in the art that many modifications and variations may be made therein without departing from the spirit of the invention, the scope of which is defined by the attached claims.

For example, in S306 described above, the notification destination is set to a user that has issued a print command to the printing system 2 within a prescribed time period. However, the process of S306 can be modified to confirm the location of the terminal device T or user in relation to the printing device 40 of the printing system 2 and to determine whether the terminal device T or user exists within a prescribed range in relation to the printing device 40 based on the results of this confirmation. That is, in the embodiment described above, a notification destination is determined from among users currently using terminal devices T that have issued print commands when paper in the printing device 40 has dropped to a level in which it is necessary to load paper quickly. However, it is possible to set the notification destination from among terminal devices T or users located within a prescribed range of the printing device 40. In this case, the user can be expected to promptly load paper into the printing device 40. Determining whether a terminal device T or a user is within a prescribed range in relation to the printing device 40 of the printing system 2 can be accomplished by using Bluetooth technology capable of performing short-range wireless communications with devices existing within a prescribed range to determine whether wireless communication is possible with such devices (terminal devices or portable devices carried by users). Alternatively, it is possible to determine whether a terminal device T or user is within a prescribed range from the printing device 40 by acquiring positional data of the terminal device T or a portable device carried by the user using GPS.

In the embodiment described above, the total number of print pages can be stored for each terminal device T, and the terminal devices T can be identified as notification destinations. Further, the type of notification in the embodiment described above relates to loading paper, but notifications can be related to other resources, such as replacing toner or ink cartridge, or to malfunctions of the printing device 40, such as a paper jam. In addition, a device other than a printing device 40 may be used. Further, programs for implementing the paper load notification processes (FIGS. 3-7) on the notification system can be stored on a storage medium, such as a CD-ROM.

In the embodiment described above, the notification destination is set with priority to users having a large total number of print pages based on the page-number data. The total number of print page of this page-number data for a user is reset to 0 each time the paper is loaded by the user (S102). However, the present invention is not limited to this process. For example, the total number of print page need not be reset to 0 each time paper is loaded. In this case, the total number of print page is recorded separately as recent data for the total number of print pages (within the past month, for example) and data for the total number of print pages from the time the printing device 40 was first used to the present. The notification destination can be set with priority to users having the most total number of recent print pages. In this way, the notification destination can be set according to recent usage. Conversely, the notification destination can be set with priority to users having the most total number of print pages from the point at which the printing device 40 was first used until the present.

In the embodiment described above, a notification is issued via e-mail using an e-mail address. However, the present invention can be configured to notify a user by a method other than e-mail, using an IP address in place of the e-mail address, for example.

The above embodiment describes an example for detecting how much paper is available by sensing the amount of remaining paper, but is not limited to this process. The present invention can be configured to detect the potential usage of consumable products other than paper. For example, when the targeted consumable product is a photosensitive drum, the date at which the photosensitive drum was installed is stored, and the potential remaining usage of the photosensitive drum (number of days until the drum can no longer be used) can be calculated by determining the number of days that have passed from this date. It is also possible to calculate the potential remaining usage of the photosensitive drum from the total number of print pages by storing the total number of pages printed after the photosensitive drum was installed. Naturally, this method is not limited to use for a photosensitive drum, but can also be used for other consumable products, such as an inkjet head or the like.

In the above-described embodiment, the printing system 2 is configured of a printer with built-in print managing server, wherein the printing device 40 and print managing server are housed in a single case. However, the printing system 2 can be configured of a separate printing device 40 and print managing server. In this case, the printing device 40 can be provided with a remaining paper detecting unit 24, while the print managing server can be provided with a printing device data acquiring unit 21, a user data acquiring unit 22, a print data acquiring unit 23, a method selecting unit 25, an operating status confirming unit 26, a usage processing unit 27, a notification destination determining unit 28, a notification processing unit 29, a storing unit 30, and a notifying unit 31. The print managing server could be a personal computer or the like and the printing device 40 could be connected to the print managing server via a LAN.

The second determining method could be a method to select a destination without consideration for the number of print pages (usage history) as long as the selected destination is a user using a currently operating terminal device T.

The third determining method could be a method to select a destination without consideration for the total pages printed (usage history) as long as the selected destination is a user currently issuing a print command.

In the embodiment described above, a notification destination is selected one at a time using one of the first through third determining methods, and a notification is issued to the selected destination, thereby notifying at least one terminal device T. However, it is also possible to select a plurality of notification destinations using a single determining method and issue the notification to these selected notification destinations.

For example, when there is high urgency (S113: YES), the process performed in S114-S120 of FIG. 4 could be replaced by the process shown in FIG. 12. In this way, a single determining method is used to determine a plurality of notification destinations and to issue notifications to this plurality of destinations. It is also possible to replace the process of S105-S112 or the process of S122-S128 with this process.

The process of the flowchart shown in FIG. 12 will be described. If it is determined in S113 of FIG. 4 that the remaining sheet number r is less than the second paper refill number Th2 (r<Th2) (S113: YES), then the process proceeds to S601 of FIG. 12. In S601, the notification processing unit 29 determines whether or not the second notification flag is set to "false". If so (S601: YES), then the process proceeds to S603. On the other hand, if not (S601: NO), then the process proceeds to S602, where the notification processing unit 29 determines whether or not a predetermined second notification time interval has elapsed since the second notification-ending time t2. If so (S602: YES), then the process advances to S603. On the other hand, if not (S602: NO), then the process returns to S101.

In S603, the determining unit 28 sets the counter value k and the counter value m to 0, and the process advances to S604. The counter value m is used to count the number of selected notification destinations when selecting a plurality of notification destinations. In S604, the determining unit 28 increments the counter value k by 1 (k←k+1). Then, in S605, the determining unit 28 determines whether or not the counter value k is greater than the number of users entered in the user data (FIG. 8) If not (S605: NO), then the process advances to S606. If so (S605: YES), then the process advances to S612.

In S606, the determining unit 28 identifies the user having the $k^{th}$ largest total number of print pages based on page-number data (FIG. 10) and sets the notification destination user j to the username of the identified user. In S607, the determining unit 28 determines whether or not the second paper loading flag for the notification destination user j is "true" based on the user data (FIG. 8) If so (S607: YES), then this means that the notification destination user j is obligated to load paper when there is high urgency, and the process advances to S608. On the other hand, if not (S607: NO), then this means that the notification destination user j is not obligated to load paper when there is high urgency, and the process returns to S604.

In S608, the operating status confirming unit 26 confirms the operating status of the terminal device T of the notification destination user j, and the determining unit 28 determines whether the notification destination user j has issued a print command within a prescribed time period, based on the results confirmed by the operating status confirming unit 26. If it is determined that the notification destination user j has issued a print command within the prescribed time period (S608: YES), then the process proceeds to S609. On the other hand, if not (S608:ND), then the user may be away from the terminal device T, and so the process returns to S604.

In S609, the e-mail address of the notification destination user j is stored in the storing unit 30 as a notification destination member, and the process advances to S610. It should be noted that in this modification, a storage area for storing notification destination members are provided in the storing unit 30, and a plurality of e-mail addresses related to a plurality of notification destinations determined by the notification destination determining process can be stored in this storage area. These notification destination members are initialized in S103 (set to "no members") at the beginning of the paper load notification process.

In S610, the determining unit 28 increments the counter value m by 1 (m←m+1). Then, in S611, it is determined whether or not the counter value m is greater than 2. If so (S611: YES), then the process advances to S612. On the other hand, if not (S611: NO), then the process returns to S604. In other words, this process is performed to determine whether the processes of S608 and S609 have been executed three times, thereby determining whether three destination addresses have been set.

In S612, e-mail is transmitted to the notification destination members stored in the storing unit 30. Here, if the process of S612 is executed after a positive determination is made in S611, three e-mail messages are transmitted. If the process of S612 is executed after a positive determination is made in S605, zero to two e-mail messages are transmitted.

Figure 4:
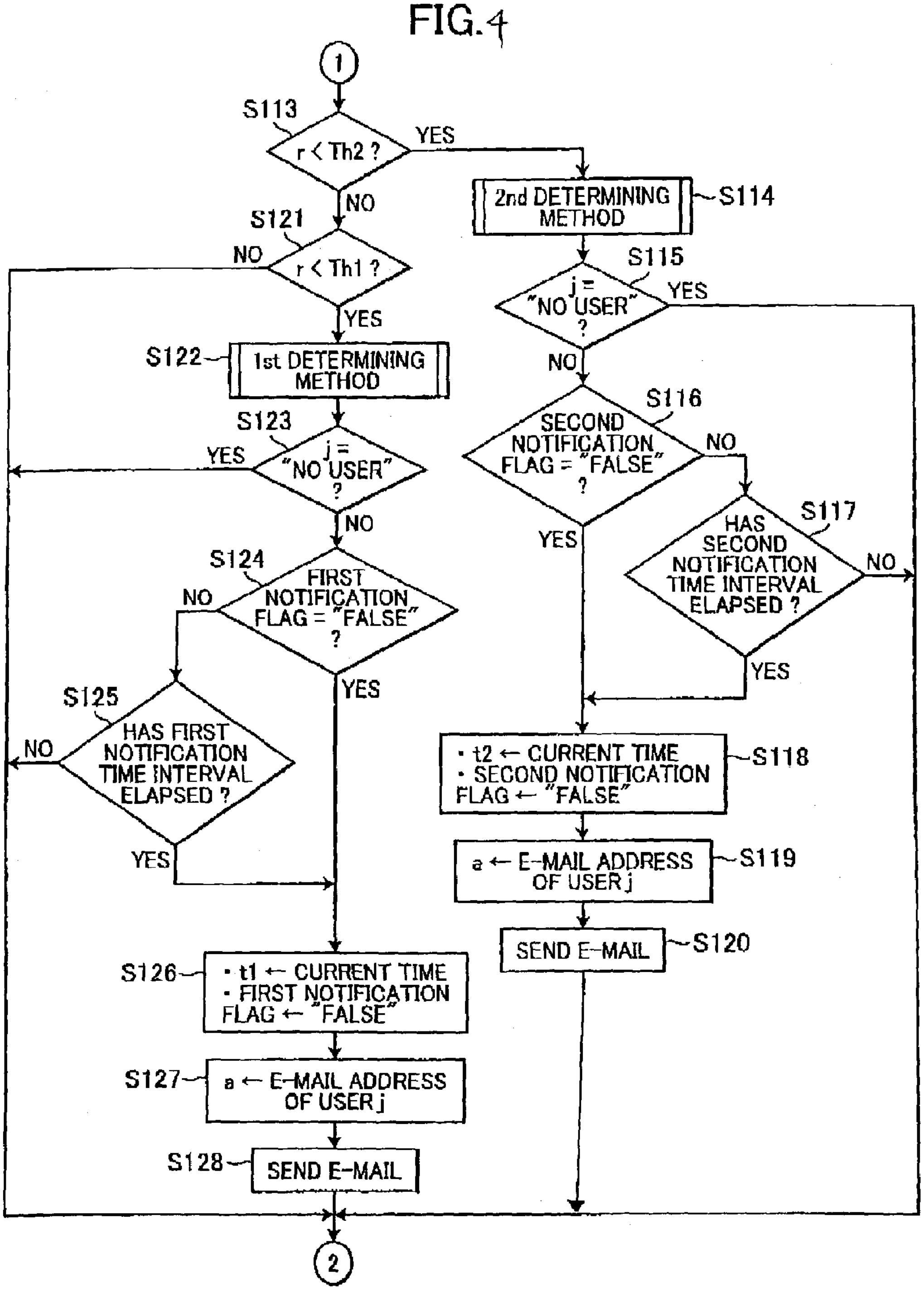
FIG. 4 is a flowchart representing a remaining part of the notification process.

In S613, the notification processing unit 29 sets the second ending time t2 to the current time and sets the second notification flag to "true" in the same manner as in S118 of FIG. 4.

Figure 12:
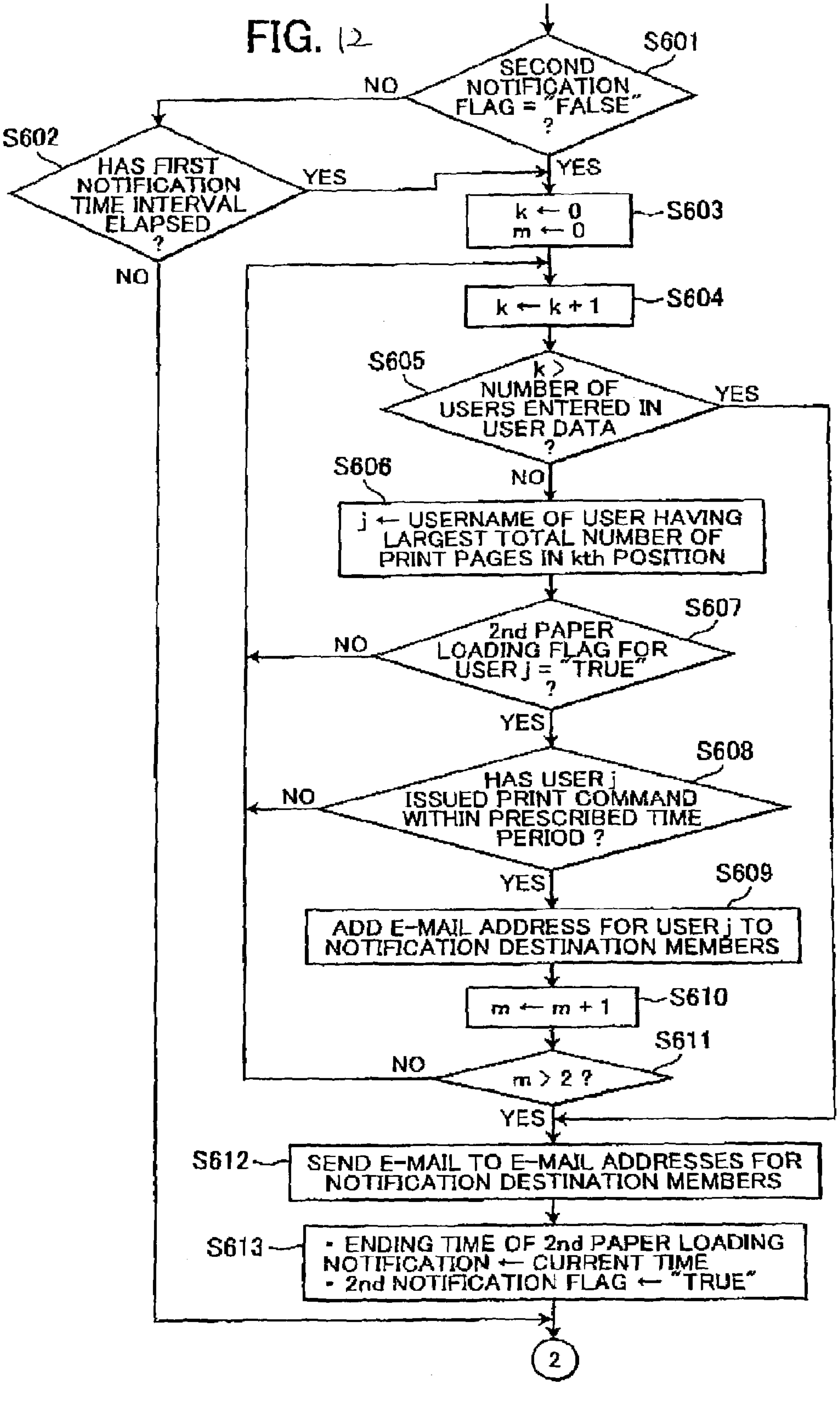
FIG. 12 is a flowchart representing a destination determining process according to a modification of the embodiment of the present invention.

Using the process of FIG. 12 and described above, a plurality of notification destinations can be set using a single determining method, and notifications can be issued to the plurality of notification destinations, thereby making it possible to notify more users. Obviously this configuration is more effective when there is great urgency to load paper (S113: YES).

One problem that can be imagined when notifying a plurality of destinations is that after one user has taken measures in response to the notification, users other than this user may not realize that the measures have already been taken and may take measures themselves in response to the notification. To avoid this, it is desirable to issue in S102 a second notification indicating that the first notification has been taken care when paper has been loaded (S101: YES). While this second notification can be issued to all users, in order to eliminate unnecessary notifications, it is desirable that the second notification be sent only to notification destinations to which a paper load notification was transmitted in S120, S128, and S208 (that is, users that were requested to load paper). When notifying a plurality of destinations using a single determining method, as in the flowchart of FIG. 12, it is obviously desirable to notify these destinations when measures have been taken in response to the first notification. In this case, e-mail is similarly transmitted to the e-mail addresses of the notification destinations recorded in the storing unit 30 as members between S101 and S102. It is possible to confirm through this notification whether measures have been taken in response to the notification data. When a user among the plurality of notification destinations takes measures to respond to the notification data, all other users are notified that the measures have been taken, thereby preventing multiple users from taking the same measures.

Further, in order to prevent retransmissions, the members recorded in the storing unit 30 are deleted after issuing the above notifications indicating that measure have been taken in response to the first notification.

What is claimed is:

1. A notification system comprising:

an electronic device that uses a consumable product; and a plurality of terminal devices each communicable with the electronic device, wherein the electronic device includes:

a detecting unit that detects a remaining potential usage of the consumable product;

a plurality of destination determining units, each destination determining unit determining at least one destination device from the plurality of terminal devices;

a unit selecting unit that selects one of the plurality of destination determining units based on the remaining potential usage detected by the detecting unit, wherein the one of the destination determining units selected by the unit selecting unit determines at least one destination device from the terminal devices; and a notifying unit that notifies at least one user of information relating to the consumable product through the at least one destination device determined by the selected destination determining unit.

2. The notification system according to claim 1, further comprising a memory that stores one of a first usage history of the electronic device for a plurality of users and a second usage history of the electronic device for the plurality of terminal devices, wherein one of the destination determining units determines the destination device based on the one of the first usage history and the second usage history.

3. The notification system according to claim 2, wherein the first usage history indicates an amount of consumable product used by each of the users, and the second usage history indicates an amount of consumable product used by each of the terminal devices.

4. The notification system according to claim 1, wherein one of the destination determining units includes:

a location detecting unit that detects one of device locations of the terminal devices and user locations of users; and a determining unit that determines the destination device based on the detection results of the location detecting unit.

5. The notification system according to claim 1, wherein one of the destination determining units includes a status detecting unit that detects operating status of the terminal devices and a determining unit that determines the destination device based on the detection results of the status detecting unit.

6. The notification system according to claim 1, wherein one of the destination determining units includes another detecting unit that detects at least one of the terminal devices and a plurality of users having requested a process that has not been completed and a determining unit that determines the destination device based on the detecting results of the another device detecting unit.

7. The notification system according to claim 1, further comprising a memory that stores one of first usage history of the electronic device for a plurality of users and second usage history of the electronic device for the plurality of terminal devices, wherein:

a first one of the destination determining units determines the destination device based on the one of the first usage history and the second usage history;

a second one of the destination determining units includes:

a location detecting unit that detects one of device locations of the terminal devices and user locations of the plurality of users; and a determining unit that determines the destination device based on the detection results of the location detecting unit;

the unit selecting unit selects the first one of the destination determining units when the remaining potential usage of the consumable product detected by the detecting unit is equal to or greater than a predetermined value; and the unit selecting unit selects the second one of the destination determining units when the remaining potential usage of the consumable product detected by the detecting unit is less than the predetermined value.

8. The notification system according to claim 1, further comprising a memory that stores one of first usage history of the electronic device for a plurality of users and second usage history of the electronic device for the plurality of terminal devices, wherein:

a first one of the destination determining units determines the destination device based on the one of the first usage history and the second usage history;

a second one of the destination determining units includes a status detecting unit that detects operating status of the plurality of terminal devices and a determining unit that determines the destination device based on the detection results of the status detecting unit;

the unit selecting unit selects the first one of the destination determining units when the remaining potential usage of the consumable product detected by the detecting unit is equal to or greater than a predetermined value; and the unit selecting unit selects the second one of the destination determining units when the remaining potential usage of the consumable product detected by the detecting unit is less than the predetermined value.

9. The notification system according to claim 8, wherein the first usage history indicates an amount of consumable product used by each of the users and the second usage history indicates an amount of consumable product used by each of the terminal devices.

10. The notification system according to claim 1, wherein the information is related to one of loading and replacing the consumable product, and each of the destination determining units determines the destination device while considering past records of the users in taking measures in response to previous notifications.

11. The notification system according to claim 1, wherein the notifying unit further notifies the destination device to which a previous notification has been issued when measures are taken in response to the previous notification.

12. A notification system comprising:

an electronic device that uses a consumable product; and a plurality of terminal devices each communicable with the electronic device, wherein:

the electronic device includes:

a memory that stores one of first usage history of the electronic device for each of a plurality of users and second usage history of the electronic device for each of the plurality of terminal devices;

a determining unit that determines at least one destination device from the plurality of terminal devices based on the one of the first usage history and the second usage history; and a notify unit that notifies the destination device of information regarding to the consumable product.

13. A notification system comprising:

an electronic device that uses a consumable product; and a plurality of terminal devices each communicable with the electronic device, wherein the electronic device includes:

a location detecting unit that detects one of user locations of a plurality of users and device locations of the plurality of terminal devices;

a determining unit that determines at least one destination device from the plurality of terminal devices based on detection results of the location detecting unit; and a notify unit that notifies the at least one destination device of information regarding to the consumable product.

14. A notification system comprising:

an electronic device that uses a consumable product; and a plurality of terminal devices each communicable with the electronic device, wherein:

the electronic device includes:

a status detecting unit that detects operating status of each of the plurality of terminal devices;

a determining unit that determines at least one destination device from the plurality of terminal devices based on detection results of the status detecting unit; and a notify unit that notifies the at least one destination device of information regarding to the consumable product.

15. A notification system comprising:

an electronic device that uses a consumable product; and a plurality of terminal devices each communicable with the electronic device, wherein the electronic device includes:

an operating unit that performs processes using consumable product when requested by one of users and the plurality of terminal devices;

a memory that stores one of a first data indicating processes requested by the users in association with the users and a second data indicating processes requested by the terminal devices in association with the terminal devices;

a detecting unit that detects at least one of the users and the terminal devices having requested a process that has not been completed, based on one of the first data and the second data stored in the memory;

a determining unit that determines at least one notification destination from the at least one of the users and the terminal devices detected by the detecting unit; and a notify unit that notifies the at least one notification destination of the information regarding to the consumable product.

16. An electronic device comprising:

an operating unit that performs processes using a consumable product;

a detecting unit that detects a remaining potential usage of the consumable product;

a plurality of determining units, each determining a destination device from a plurality of terminal devices;

a unit selecting unit that selects one of the plurality of destination determining units based on detection results of the detecting unit, wherein the selected one of the destination determining units determines the destination device; and a notify unit that notifies a user of information relating to the consumable product through the destination device.

17. An electronic device comprising:

a communication unit that is communicable with a plurality of terminal devices;

a memory that stores one of a first amount of the consumable product used by each of a plurality of users and a second amount of the consumable product used by each of the plurality of terminal devices;

a determining unit that determines at least one destination device from the plurality of terminal devices based on one of the first amount and the second amount stored in the memory; and a notify unit that notifies the at least one destination device of information relating to the consumable product.

18. An electronic device comprising:

a communication unit that is communicable with a plurality of terminal devices;

an operating unit that performs processes using a consumable product;

a detecting unit that detects one of user locations of a plurality of users and device locations of the terminal devices;

a determining unit that determines at least one destination device from the plurality of terminal devices based on detection results of the detecting unit; and a notify unit that notifies the destination device of information regarding to the consumable product.

19. An electronic device comprising:

an operating unit that performs processes using a consumable product;

a communication unit that is communicable with a plurality of terminal devices;

a second detecting unit that detects operating status of each of the plurality of terminal devices; and a determining unit that determines at least one destination device from the plurality of terminal devices based on the detection results of the second detecting units; and a notify unit that notifies the at least one destination device of information regarding to the consumable product.

20. An electronic device comprising:

a communication unit that communicable with a plurality of terminal devices;

an operating unit that performs processes using a consumable product when requested by one of users and the terminal devices;

a memory that stores one of a first data regarding processes requested by the users in association with the users and a second data regarding processes requested by the terminal devices in association with the terminal devices;

a determining unit that determines, as a notification destination, at least one of the users and the terminal devices having requested a process that has not been completed, based on one of the first data and the second data stored in the memory; and a notify unit that notifies the notification destination of information regarding to the consumable product.

21. A notifying method of notifying a destination device of information relating to a consumable product, the notify method comprising the steps of:

detecting a remaining potential usage of a consumable product that is used by an electronic device communicable with each of a plurality of terminal devices;

selecting one of a plurality of determining methods based on the detected remaining potential usage, each of the plurality of determining methods being a method of determining a destination device from the plurality of terminal devices;

determining the destination device from the plurality of terminal devices by performing a process according to the selected method; and notifying a user of information relating to the consumable product through the destination device.

22. A notifying method of notifying a destination device of information relating to a consumable product, the notify method comprising the steps of:

storing, into a memory, one of a first amount of a consumable product used by each of a plurality of users and a second amount of the consumable product used by each of a plurality of terminal devices, the consumable product being provided to an electronic device communicable with each of the plurality of terminal devices;

determining a destination device from the plurality of terminal devices based on one of the first amount and the second amount stored in the memory; and notifying the destination device of information relating to the consumable product.

23. A notifying method of notifying a destination device of information relating to a consumable product, the notify method comprising the steps of:

detecting one of user locations of a plurality of users and device locations of a plurality of terminal devices communicable with an electronic device;

determining a destination device from the plurality of terminal devices based on the detected locations; and notifying the destination device of information relating to a consumable product that is used in the electronic device.

24. A notifying method of notifying a destination device of information relating to a consumable product, the notify method comprising the steps of:

detecting operating status of each of a plurality of terminal devices each communicable with an electronic device;

determining a destination device from the plurality of terminal devices based on the detected operating status; and notifying the destination device of information regarding to a consumable product that is used by the electronic device.

25. A notifying method of notifying a destination device of information relating to a consumable product, the notify method comprising the steps of:

storing one of a first data and a second data into a memory, the first data regarding to process requested by users in association with the users, the second data regarding to process requested by terminal devices each communicable with an electronic device in association with the terminal devices, the process being performed by the electronic device using a consumable product;

determining, as a notification destination, at least one of the users and the terminal devices having requested a process which has not been completed, based on one of the first data and the second data stored in the memory; and notifying the notification destination of information regarding to the consumable product.

26. A notifying program stored as computer-executable instructions on a computer-readable medium for notifying a destination device of information relating to a consumable product, the notify program comprising the programs of:

detecting a remaining potential usage of a consumable product that is used by an electronic device communicable with each of a plurality of terminal devices;

selecting one of a plurality of determining methods based on the detected remaining potential usage, each of the plurality of determining methods being a method of determining a destination device from the plurality of terminal devices;

determining the destination device from the plurality of terminal devices by performing a process according to the selected method; and notifying a user of information relating to the consumable product through the destination device.

27. A notifying program stored as computer-executable instructions on a computer-readable medium for notifying a destination device of information relating to a consumable product, the notify program comprising the programs of:

storing, into a memory, one of a first amount of a consumable product used by each of a plurality of users and a second amount of the consumable product used by each of a plurality of terminal devices, the consumable product being provided to an electronic device communicable with each of the plurality of terminal devices;

determining a destination device from the plurality of terminal devices based on one of the first amount and the second amount stored in the memory; and notifying the destination device of information relating to the consumable product.

28. A notifying program stored as computer-executable instructions on a computer-readable medium for notifying a destination device of information relating to a consumable product, the notify program comprising the programs of:

detecting one of user locations of a plurality of users and device locations of a plurality of terminal devices communicable with an electronic device;

determining a destination device from, the plurality of terminal devices based on the detected locations; and notifying the destination device of information relating to a consumable product that is used in the electronic device.

29. A notifying program stored as computer-executable instructions on a computer-readable medium for notifying a destination device of information relating to a consumable product, the notify program comprising the programs of:

detecting operating status of each of a plurality of terminal devices each communicable with an electronic device;

determining a destination device from the plurality of terminal devices based on the detected operating status; and notifying the destination device of information regarding to a consumable product that is used by the electronic device.

30. A notifying program stored as computer-executable instructions on a computer-readable medium for notifying a destination device of information relating to a consumable product, the notify program comprising the programs of:

storing one of a first data and a second data into a memory, the first data regarding to process requested by users in association with the users, the second data regarding to process requested by terminal devices each communicable with an electronic device in association with the terminal devices, the process being performed by the electronic device using a consumable product;

determining, as a notification destination, at least one of the users and the terminal devices having requested a process which has not been completed, based on one of the first data and the second data stored in the memory; and notifying the notification destination of information regarding to the consumable product.

* * * * *